United States Patent
Robertsson

(10) Patent No.: US 12,232,441 B2
(45) Date of Patent: Feb. 25, 2025

(54) MAINTENANCE FOR A ROBOTIC WORKING TOOL

(71) Applicant: HUSQVARNA AB, Huskvarna (SE)

(72) Inventor: Mikael Robertsson, Gränna (SE)

(73) Assignee: HUSQVARNA AB, Huskvarna (SE)

(*) Notice: Subject to any disclaimer, the term of this patent is extended or adjusted under 35 U.S.C. 154(b) by 1126 days.

(21) Appl. No.: 17/044,014

(22) PCT Filed: Mar. 19, 2019

(86) PCT No.: PCT/EP2019/056772
§ 371 (c)(1),
(2) Date: Sep. 30, 2020

(87) PCT Pub. No.: WO2019/192834
PCT Pub. Date: Oct. 10, 2019

(65) Prior Publication Data
US 2021/0029874 A1   Feb. 4, 2021

(30) Foreign Application Priority Data

Apr. 4, 2018 (SE) .................................. 1850371-4

(51) Int. Cl.
*A01D 34/00* (2006.01)
*G05B 19/4155* (2006.01)
(Continued)

(52) U.S. Cl.
CPC ....... *A01D 34/008* (2013.01); *G05B 19/4155* (2013.01); *G05D 1/0088* (2013.01);
(Continued)

(58) Field of Classification Search
CPC ............. A01D 34/008; G05B 15/4155; G05D 1/0088
See application file for complete search history.

(56) References Cited

U.S. PATENT DOCUMENTS 4,816,733 A * 3/1989 Sakakibara .......... G05B 19/182
318/632
9,345,546 B2 * 5/2016 Toth ....................... G16H 40/40
(Continued)

FOREIGN PATENT DOCUMENTS

EP   2927854 A1   10/2015
GB   2403042 A    12/2004
(Continued)

OTHER PUBLICATIONS

Swedish Office Action and Search Report for Swedish Application No. 1850371-4, Mailed on Nov. 5, 2018.
(Continued)

*Primary Examiner* — Andrew Joseph Rudy
(74) *Attorney, Agent, or Firm* — Burr & Forman

(57) ABSTRACT

A method for use an original robotic working tool and a replacement robotic working tool, the method comprising: connecting the original robotic working tool to the replacement robotic working tool; transferring operational data from the original robotic working tool to the replacement robotic working tool and enabling the replacement robotic working tool to operate as a replacement for the original robotic working tool.

9 Claims, 3 Drawing Sheets

(51) Int. Cl.
*G05D 1/00* (2006.01)
*A01D 101/00* (2006.01)

(52) U.S. Cl.
CPC .................. *A01D 2101/00* (2013.01); *G05B 2219/34348* (2013.01); *G05D 1/0219* (2013.01); *G05D 1/0274* (2013.01)

(56) References Cited

U.S. PATENT DOCUMENTS

| | | | | |
|---|---|---|---|---|
| 9,489,832 | B2* | 11/2016 | Nair | G05B 19/418 |
| 9,973,831 | B2* | 5/2018 | Mejegård | H04W 4/80 |
| 10,664,918 | B1* | 5/2020 | Slusar | B60W 40/09 |
| 11,537,587 | B2* | 12/2022 | Lazier | G06F 16/2477 |
| 11,589,503 | B2* | 2/2023 | Balutis | A01D 34/008 |
| 11,845,187 | B2* | 12/2023 | Dooley | G05D 1/0219 |
| 2007/0293989 | A1* | 12/2007 | Norris | G05B 9/03 |
| | | | | 700/245 |
| 2013/0116804 | A1 | 5/2013 | Extra | |
| 2015/0045948 | A1 | 2/2015 | Bjorn et al. | |
| 2015/0123815 | A1 | 5/2015 | Mejegard et al. | |
| 2016/0150739 | A1 | 6/2016 | Fisher | |
| 2018/0035606 | A1* | 2/2018 | Burdoucci | A01D 34/84 |

FOREIGN PATENT DOCUMENTS

| | | | |
|---|---|---|---|
| JP | H0726723 | Y2 | 6/1995 |
| KR | 101459245 | B1 | 11/2014 |

OTHER PUBLICATIONS

International Search Report and Written Opinion for International Application No. PCT/EP2019/056772 mailed Jun. 17, 2019.

* cited by examiner

MAINTENANCE FOR A ROBOTIC WORKING TOOL

TECHNICAL FIELD

This application relates to robotic working tools and in particular to a robotic working tool and a method for performing improved maintenance of the robotic working tool, such as a lawnmower, in a robotic working tool system, such as a robotic lawnmower system.

BACKGROUND

Automated or robotic working tools such as robotic lawnmowers are becoming increasingly more popular. In a typical deployment, a work area (such as a garden) is enclosed by a boundary cable with the purpose of keeping the robotic lawnmower inside the work area. The robotic lawnmower is typically configured to work inside the work area in a random manner or by following a more or less complicated scheduling possibly taking into account features, such as trees, houses or other obstacles of the work area.

The signals used for controlling the robotic lawnmowers are also becoming more and more advanced enabling a more precise control of the robotic lawnmower, controlling more than one robotic lawnmower at a time, and also enabling for theft control such as by assigning identifiers and executing identifying procedures when starting up a robotic lawnmower. As robotic lawnmowers become more complex, so does the setup of the robotic lawnmowers, which usually involves some kind of training especially when the robotic lawnmower is adapted to take into account features of the work area.

Modern robotic lawnmowers may also be paired with a smartphone "app" or other computer software for remotely supervising and/or controlling the robotic lawnmower. Such an app may not work, or will at least need additional setup and modifications to operate properly, when a replacement robotic lawnmower is to be used.

As will be discussed in the below, the inventors have realized problems with these kinds of robotic lawnmower systems when it comes to maintenance. During maintenance, the robotic lawnmower, will most likely be handed into a repair shop. As the repairs may take some time, the garden will be left unattended unless maintained manually which is definitely not what the owner of the robotic lawnmower intended when purchasing a robotic lawnmower.

Installing a new or replacement robotic lawnmower will require quite some effort on the part of the owner, or incur higher costs if done by the service provider All training and setup needs to be repeated, app systems need to be synchronized and updated, and when the original robotic lawnmower is ready, much of the setup and modifications needs to be repeated again.

Thus, as the inventors have realized, there is a need for improved handling of a robotic lawnmower's operation during maintenance of the robotic lawnmower.

SUMMARY

As stated in the background section, the inventors have realized that there are problems with current setups as regards maintenance and that there is a need for improved handling of a robotic lawnmower's operation during maintenance of the robotic lawnmower. However, as will be disclosed in detail in the detailed description, the inventors have also realized that there is a simple solution to the realized problems caused by the complicated setups of robotic working tools, such as robotic lawnmowers, when the robotic working tool is unable to operate for a prolonged time (i.e. a time under which the work area will become affected without proper attention). Based on this simple solution it is an object of the teachings of this application to overcome or at least reduce those problems by providing a robotic working tool comprising a controller and a memory arranged to store operation data, the robotic lawnmower being configured to receive original operation data of an original also referred to as a second robotic working tool, store said original operation data in said memory and operate according to said original operation data, thereby enabling the robotic working tool to act as a replacement working tool for the second robotic working tool in a robotic working tool system of the second robotic working tool.

It is also an object of the teachings of this application to overcome the problems by providing a method for use in a robotic working tool comprising a memory arranged to store operation data, the method comprising the robotic working tool receiving original operation data of a second robotic working tool, storing said original operation data in said memory and operating according to said original operation data, thereby enabling the robotic working tool to act as a replacement working tool for the second robotic working tool in a robotic working tool system of the second robotic working tool.

It is also an object of the teachings of this application to overcome the problems by providing a method for use in a robotic working tool system comprising an original robotic working tool and a replacement robotic working tool, the method comprising: transferring operational data from the original robotic working tool to the replacement robotic working tool and enabling the replacement robotic working tool to operate as a replacement for the original robotic working tool. Thus, the robotic working tool may be replaced without any need for difficult or time-consuming setups.

Key aspects of the invention disclosed herein is the realization of the problem(s) and the provision of the simple and elegant solution to this/these problem(s). As disclosed herein, the inventors are proposing the very simple and elegant solution of copying the relevant data from the original robotic lawnmower to the replacement robotic lawnmower. The replacement robotic lawnmower may then be enabled to operate exactly as the original robotic lawnmower without the user having to add new robotic lawnmowers to any applications, updating any charging stations or otherwise perform mundane tasks.

The inventors have further realized that by enabling the robotic lawnmowers to copy each other, any user must have access to the original robotic lawnmower to enable a replacement robotic lawnmower to operate in a specific work environment. The integrity of the system is thus protected as a stolen robotic lawnmower may not be enabled to operate in any robotic lawnmower system.

This simple and elegant solution of copying the operation data thus solves many problems in one single action and enables the replacement robotic lawnmower to assume the duties of the original robotic lawnmower without the user having to perform any mundane tasks.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

It should be noted that even though the description given herein will be focused on robotic lawnmowers, the teachings herein may also be applied to robotic cleaners such as robotic vacuum cleaners and/or robotic floor cleaners, robotic ball collectors, robotic mine sweepers, robotic farming equipment, or other robotic working tools to be employed in a work area defined by a boundary.

Figure 1A:
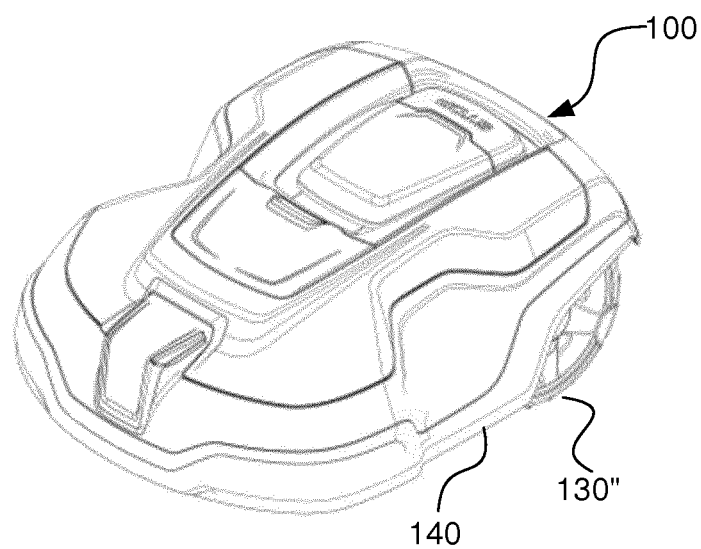
FIG. 1A shows an example of a robotic lawnmower according to one embodiment of the teachings herein.

FIG. 1A shows a perspective view of a robotic working tool 100, here exemplified by a robotic lawnmower 100, having a body 140 and a plurality of wheels 130 (only one shown). The robotic lawnmower 100 may comprise charging skids for contacting contact plates (not shown in FIG. 1) when docking into a charging station (not shown in FIG. 1, but referenced 210 in FIG. 2) for receiving a charging current through, and possibly also for transferring information by means of electrical communication between the charging station and the robotic lawnmower 100.

Figure 1B:
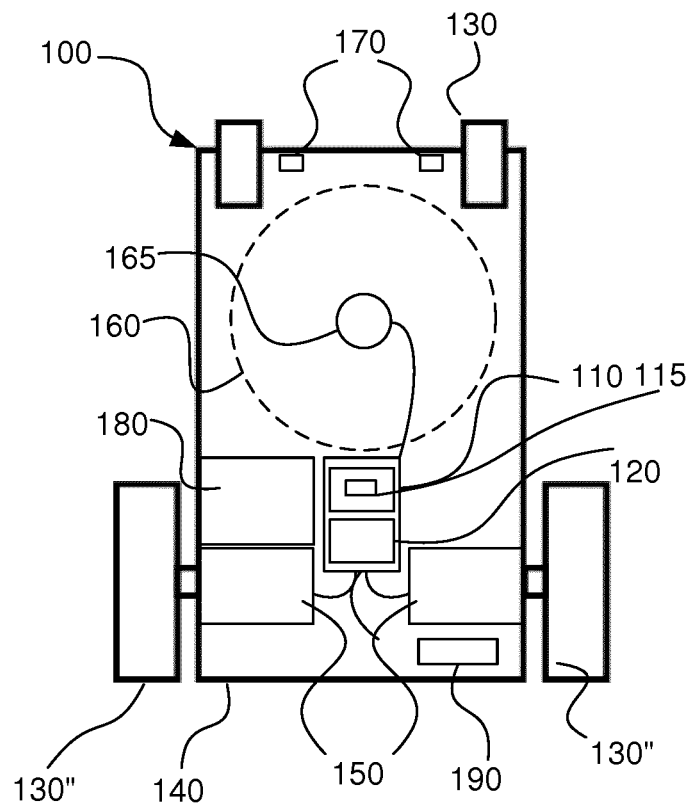
FIG. 1B shows a schematic view of the components of an example of a robotic lawnmower according to one embodiment of the teachings herein.

FIG. 1B shows a schematic overview of the robotic working tool 100, also exemplified here by a robotic lawnmower 100, having a body 140 and a plurality of wheels 130. In the exemplary embodiment of FIG. 1B the robotic lawnmower 100 has 4 wheels 130, two front wheels 130' and the rear wheels 130". At least some of the wheels 130 are drivably connected to at least one electric motor 150. It should be noted that even if the description herein is focused on electric motors, combustion engines may alternatively be used possibly in combination with an electric motor. In the example of FIG. 1B, each of the rear wheels 130" is connected to a respective electric motor 150. This allows for driving the rear wheels 130" independently of one another which, for example, enables steep turning.

The robotic lawnmower 100 also comprises a controller 110. The controller 110 may be implemented using instructions that enable hardware functionality, for example, by using executable computer program instructions in a general-purpose or special-purpose processor that may be stored on a computer readable storage medium (disk, memory etc) 120 to be executed by such a processor. The controller 110 is configured to read instructions from the memory 120 and execute these instructions to control the operation of the robotic lawnmower 100 including, but not being limited to, the propulsion of the robotic lawnmower. The controller 110 may be implemented using any suitable, available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The memory 120 is arranged to store data pertaining to the operation of the robotic lawnmower 100. One example of such data is a virtual map of the work area, storing positions of the boundary, objects, features (such as inclination, ground composition (grass thickness, tiles, gravel . . . ), location of charging station, and/or passages, to mention a few examples. Another example of such data is identifying data for identifying the robotic lawnmower 100 to the charging station and/or to a controlling application. Yet another example is data on the control signals that are used by a signal generator comprised in the charging station that will be used to identify the boundary 230 to the robotic lawnmower 100. These examples, and others, are not mutually exclusive, and the data may comprise any and/or all or any combination of the example data given herein.

The controlling application may be executed by a server application (possibly through a cloud connection executed via a communication interface 115), a smartphone application and/or by the charging station 210 being arranged with a controller-memory arrangement 220. The controlling application may control operations of the robotic lawnmower 100 possibly relating to the scheduling of the robotic lawnmower's work. The controlling application may also or alternatively comprise an anti-theft application.

As would be understood by a skilled person the controlling application may in fact comprise several applications being executed by different entities, each relating possibly to one aspect of the robotic lawnmower's operation.

One typical example would be where one aspect of the controlling application is executed by the controller-memory arrangement 220 of the charging station 210 is arranged to store and match identifiers for the robotic lawnmower 100 to ensure that the robotic lawnmower 100 is operating in the correct work area, and another aspect of the controlling application is executed by a remote server for providing scheduling information to the robotic lawnmower 100. The controlling application may be executed as a cloud or other server application, controlled and accessed via a smartphone application, executed on a smartphone 225.

Figure 2:
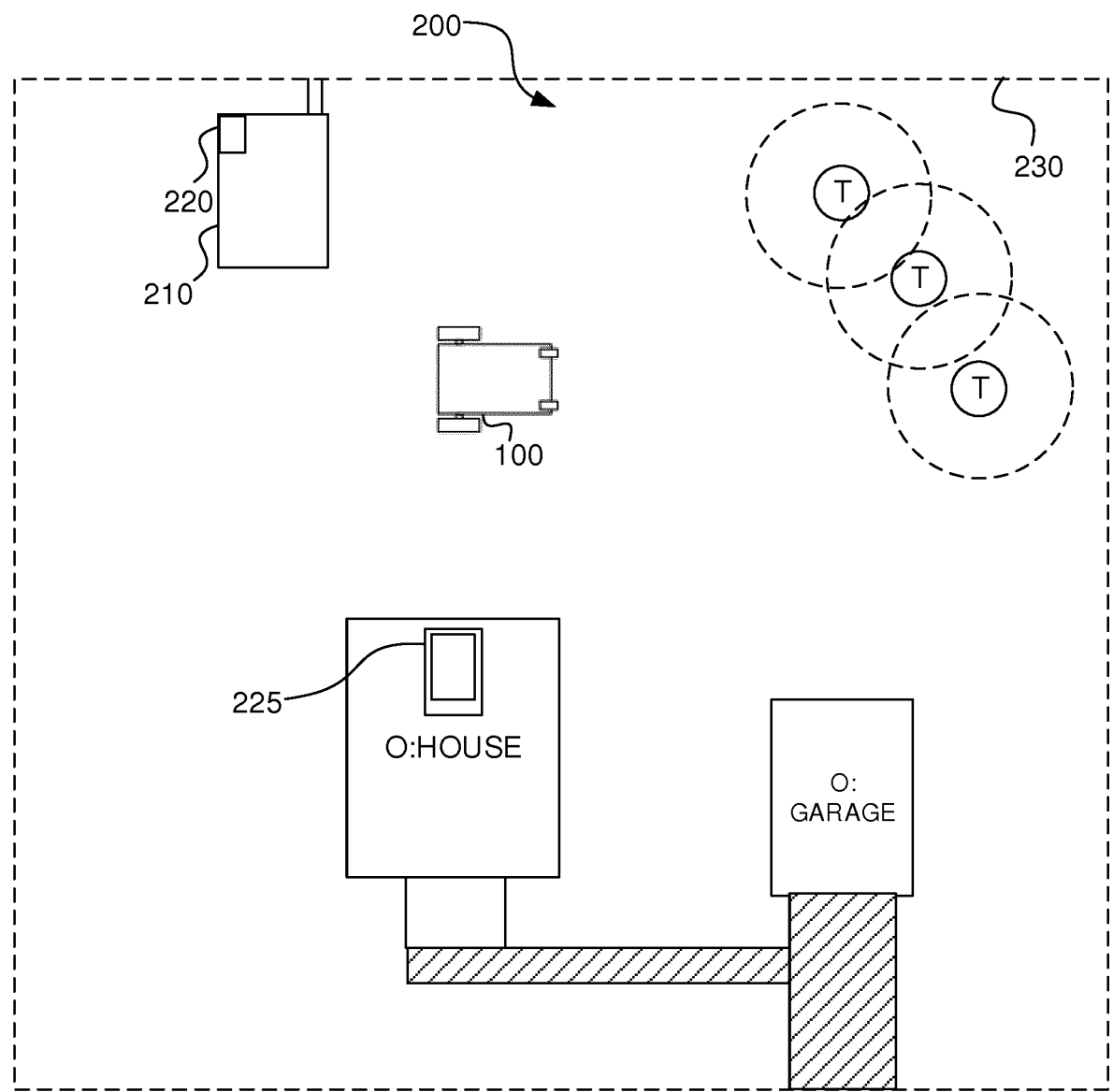
FIG. 2 shows an example of a robotic lawnmower system according to the teachings herein.

Another or supplemental example would be where one aspect of the controlling application is executed by the controller-memory arrangement 220 of the charging station 210 is arranged to store and match identifiers for the robotic lawnmower 100 to ensure that the robotic lawnmower 100 is operating in the correct work area, and another aspect of the controlling application is executed by a remote server, such as a robotic lawnmower fleet server, not shown explicitly in FIG. 2, for providing fleet scheduling information to the robotic lawnmower 100.

The controlling application may alternatively or additionally be arranged to compare and match identifiers of the robotic lawnmower and of the charging station (or other unit associated with the work area, possibly coordinates) and only enable the robotic lawnmower for operating in the work area if the identifiers match.

As can be seen, there are many ways of implementing different aspects of a controlling application. However, for the purpose of this patent application, the controlling application will be discussed in reaction to a single controlling application or the text would become too complicated and unreadable.

The robotic lawnmower 100 may further be arranged with a communication interface 115 for communicating with other devices, such as a server, a personal computer or smartphone, or the charging station. The communication interface may be a wireless communication interface. Examples of such wireless communication devices are Bluetooth, Global System Mobile (GSM) and LTE (Long Term Evolution), to name a few. The communication interface may also or alternatively be a wired interface, such as a universal serial bus (USB) connection or Controller Area Network (CAN) connection.

The robotic lawnmower 100 also comprises a grass cutting device 160, such as a rotating blade 160 driven by a cutter motor 165. The grass cutting device being an example of a work tool 160 for a robotic working tool 100. The robotic lawnmower 100 also has at least one battery 180 for providing power to the motors 150 and the cutter motor 165.

The robotic lawnmower 100 may be further configured to have at least one magnetic sensor 170 arranged to detect a magnetic field (not shown) and for detecting a boundary cable and/or for receiving and possibly also sending information from a signal generator (will be discussed with reference to FIG. 2). In some embodiments, the sensors 170 may be connected to the controller 110, and the controller 110 may be configured to process and evaluate any signals received from the sensor pairs 170, 170'. The sensor signals may be caused by the magnetic field being generated by a control signal being transmitted through a boundary cable. This enables the controller 110 to determine whether the robotic lawnmower 100 is close to or crossing a boundary cable, or inside or outside an area enclosed by the boundary cable. This also enables the robotic lawnmower 100 to receive, and possibly send, information from the control signal.

It should be noted that the magnetic sensor(s) 170 as well as the boundary cable (referenced 230 in FIG. 2) and any signal generator(s) are optional as is indicated by the dashed line of the boundary cable (230) in FIG. 2. The boundary cable may simply be used as an additional safety measure.

The robotic lawnmower 100 may also or alternatively comprise a navigation sensor 190. In one embodiment, the navigation sensor is a satellite navigation sensor, such as a Global Positioning System (GPS) device 190, or a GLONASS device. The navigation sensor may also or alternatively be a deduced reckoning sensor 190, such as comprising a compass, a gyro and or an odometer.

Using the navigation sensor 190 the robotic lawnmower may be configured to navigate the work area using stored coordinates. The coordinates for the work area (referenced 205 in FIG. 2), may be stored in the form of a virtual map as to be stored by the memory 120 of the work area. Such a map may include information on obstacles (referenced O in FIG. 2). The robotic lawnmower may thus be arranged to navigate the work area in a precise manner using the navigation sensor 190 and the map, thereby also being able to service different portions of the work area.

As has been indicated above, in one embodiment, the robotic lawnmower is configured to navigate the work area based on the navigation sensor 190 without utilizing a boundary cable, or using the boundary cable only as an emergency fall back, should the other navigation sensors fail. The boundary cable is as such not an essential part of the robotic lawnmower system. In one embodiment, the navigation sensor may also be used to navigate based on signals received from beacons (not shown) such as Ultra Wide Band (UWB) beacons.

FIG. 2 shows a schematic view of a robotic working tool system 200 in one embodiment. The schematic view is not to scale. The robotic working tool system 200 comprises a charging station 210, a robotic working tool 100 and at least one beacon 220. As discussed above, the beacon(s) 220 may be used to mark a perimeter of the work area or an obstacle/area in the work area 205. As with FIGS. 1A and 1B, the robotic working tool is exemplified by a robotic lawnmower, but the teachings herein may also be applied to other robotic working tools adapted to operate within a work area.

The robotic working tool system 220 may also optionally comprise a boundary cable 230 arranged to enclose a work area 205, in which the robotic lawnmower 100 is supposed to serve. For its operation within the work area 205, in the embodiment of FIG. 2, the robotic lawnmower 100 may additionally use the navigation device 190 to navigate the work area 205.

The work area 205 is in this application exemplified as a garden, but can also be other work areas as would be understood. The garden contains a number of obstacles (O), exemplified herein by a house (O:HOUSE) and a garage (O:GARAGE) that are surrounded by a lawn. In front of the garage there is a drive way and a small path leads to the house from the driveway. There are also other obstacles in the garden represented by a number (3) of trees (T). The trees are marked both with respect to their trunks (filled lines) and the extension of their foliage (dashed lines).

Returning to the controlling application and the operation data, such as the identifiers and the map, the inventors have realized that as a robotic lawnmower is taken for maintenance and is to be replaced by a replacement robotic lawnmower, the replacement robotic lawnmower should be updated with the relevant data to operate successfully in the working environment of the original robotic lawnmower 100.

Figure 3:
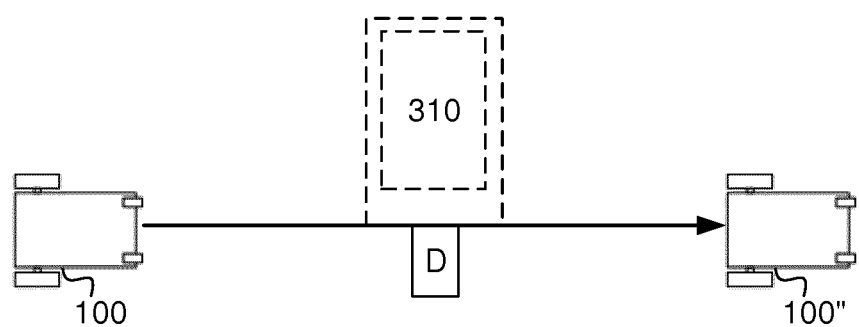
FIG. 3 shows a schematic view of an original robotic lawnmower and a replacement robotic lawnmower according to the teachings herein.

FIG. 3 shows a schematic view of an original robotic lawnmower 100 and a replacement robotic lawnmower 100". Both robotic lawnmowers are examples of the robotic lawnmower 100 as discussed in relation to FIG. 1B and both are arranged with a controller-memory arrangement (110/120) as discussed in relation to FIG. 1B. The memory 120 of the original robotic lawnmower 100 storing data relevant to the operation of the original robotic lawnmower 100, such as identifiers and a map.

The robotic lawnmower system 200 has to be updated to accommodate for the replacement robotic lawnmower 100" or the replacement robotic lawnmower 100" will not be able to operate correctly. For example, as the replacement robotic lawnmower 100" has a different identifier than the original robotic lawnmower 100, the controller-memory of the charging station 210 may not allow the robotic lawnmower to charge in the station. Also, if the replacement robotic lawnmower 100" has stored a different control signal than the original robotic lawnmower 100, the replacement robotic lawnmower 100" may not be able to successfully detect the boundary 230.

However, due to the complexity of robotic lawnmower systems 200 and controlling applications, controlling applications possibly being executed by different devices, it will most likely be too cumbersome to ensure that the replacement robotic lawnmower 100" is properly updated in all aspects of the system, i.e. changing storing the identifier for the replacement robotic lawnmower 100" in the controller-memory arrangement 220 of the charging station, updating the controlling application for taking account of the new replacement robotic lawnmower 100" and so on. It should be kept in mind that the users of robotic lawnmowers are expecting a hassle-free setup that allows them to save time by not having to perform mundane tasks.

The robotic lawnmower system as per herein is designed for copying the relevant data from the original robotic lawnmower 100 to the replacement robotic lawnmower 100". The replacement robotic lawnmower 100" may then be enabled to operate exactly as the original robotic lawnmower 100 without the user having to add new robotic lawnmowers to any applications, updating any charging stations or otherwise perform mundane tasks.

Relevant data is here seen as the data needed for proper operation in the given work area. As such, it is highly dependent on the actual system used and is difficult to exemplify exhaustively. Identifier(s), virtual map(s), data on control signal(s) are some example of data that may be relevant for the operation, in any if any combination.

The transfer of relevant data may be issued through the control interface 115, either wirelessly or wired. The transfer may be issued directly or indirectly through an intermediate server 310. The intermediate server 310 is optional as indicated by the dashed lines in FIG. 3. The server 310 may be a part of or associated with the controlling application. For a wired transfer, it may suffice connecting the two robotic lawnmowers with a data cable, such as a USB cable or through an indirect wired transfer, such as a USB memory stick. For a wireless transfer, the two robotic lawnmowers may be arranged to air through a Bluetooth connection, connect to the same WiFi network or establish a connection over a GSM or LTE network.

The USB memory stick, the remote server and the cloud service are examples of indirect data storage transfers.

The replacement robotic lawnmower 100" may be arranged to operate in a replacement mode, where it assumes the identity of the original robotic lawnmower 100 by receiving relevant operating data of the original robotic lawnmower being transferred.

The replacement robotic lawnmower 100" or a controlling application may be arranged to enable the replacement robotic lawnmower 100" to operate using the transferred operating data for a time period.

The time period may be set internally in the replacement robotic lawnmower 100". In such an embodiment, the robotic lawnmower 100" will revert to its old settings and/or cancel the replacement settings as the time period expires.

Alternatively or additionally, the time period may be set in the controlling application, or a system that is associated with the controlling application such as a cloud or server application, herein seen to be part of the controlling application).

The time period may be set prematurely as a set time period, for example 1 day or 1 week, it should be noted that these are only examples and many other time periods are possible.

In one embodiment, a prompt may be given before the time period expires for extending the time period. The prompt may be given by the controlling application, the robotic lawnmower or another device being part of or being connected to the system. The prompt may be accompanied by a password command or other authentication method. In one embodiment, the prompt is given by one device (for example the robotic lawnmower 100") and the acceptance of the extension is given through a second device, for example the controlling application or by a maintenance controlling application). This ensures a secure extension of the time period in that more than one device and/or user of a device need be active in the extension of the time period. For example, as the prompt is given, the user may contact the repair firm who will then, possibly remotely, extend the time period.

The time period may be set to expire upon a given cancellation command, such as a command to revert from replacement mode in the embodiment where the replacement robotic lawnmower 100" is configured to operate in a replacement mode.

For embodiments where the controlling application is keeping track of the time period, a connected server application or other cloud service may be used to extend or cancel the time period.

As a supplement or addition to the time period, and to ensure that an original robotic lawnmower is not used to clone general replacement robotic lawnmowers, there may be a setting in a robotic lawnmower according to herein that indicates how many times and/or to how many replacement robotic lawnmowers that the robotic lawnmower may be cloned. The number of clones may also be dependent on a time period ensuring that only a number, perhaps one, clone is active during a time period of for example a week.

The cloning number may be implemented as a setting in the original robotic lawnmower, as part of the data to be transferred, or associated with the data or original robotic lawnmower (for example through an identifier) and stored in a server application, perhaps associated with the controlling application, such as a server application that the controlling application is associated with.

Such embodiments enable control of how many clones may be active at any given time.

Alternatively or as a supplement, a data set may be arranged as a stand-alone unit. In addition, a robotic lawnmower may be configured to only hold one data set. This may be used to only allow one robotic lawnmower at a time to operate using the data set associated with the particular system/work area. In such an embodiment, as a transfer of data is made, the robotic lawnmower, and/or the controlling application, deletes the data set of the robotic lawnmower transferring the data, so that the data only exists in the receiving robotic lawnmower.

The data set may be encrypted or protected in other manners to maintain its integrity.

In one embodiments, some aspects of the data to be transferred may be added or cumulated to the data of the receiving robotic lawnmower. One such example of data to be added or cumulated is the operating time. The operating time may be used to bill a service receiver properly. However, in such an embodiment, the operating time should not be added to the actual operating time of the robotic lawnmower as this will bring about unnecessary and premature maintenance.

In one embodiment, where the replacement robotic lawnmower is to replace the original robotic lawnmower indefinitely, the data transfer may be performed requiring an authentication.

To enable the transfer of operation data, a robotic lawnmower 100 may be arranged with a control menu option that enables for a one-click copy of the data. The transfer may also be effected automatically by a robotic lawnmower being configured to detect that it is being connected to another robotic lawnmower, the order in which the connection being made indicating the role of the robotic lawnmowers. For example, the robotic lawnmower first being connected to a cable, will be the original robotic lawnmower, and the robotic lawnmower last being connected will be the replacement robotic lawnmower (or vice-versa). For the embodiment of the robotic lawnmower being enable to enter a replacement mode, the robotic lawnmower 100 may be configured to establish a connection (or wait until a connection is established, such as when a wired connection has been made) with the original robotic lawnmower and copy the data as the replacement mode is entered and the connection is verified.

The transfer may also be effected through an intermediate server, the server 310 then possibly indicating the roles of the connected robotic lawnmowers.

The server may be used to implement a controlling application, or an aspect of one, for the maintenance provider. One example of such an application is the Autocheck application from Husqvarna AB.

Figure 4:
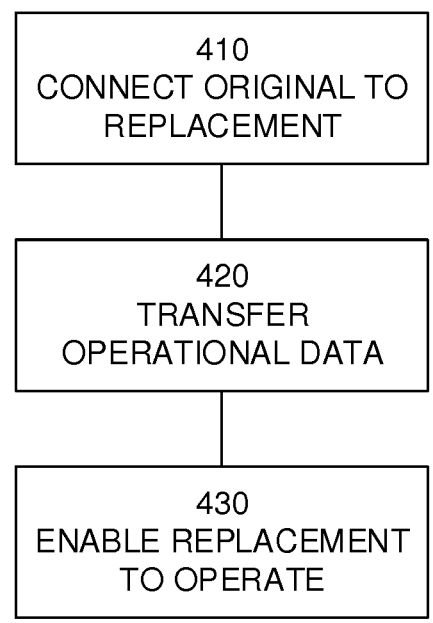
FIG. 4 shows a corresponding flowchart for a method according to an example embodiment.

FIG. 4 shows a flowchart for a general method according to the teachings herein where a connection 410 is being made between an original robotic lawnmower 100 and a replacement robotic lawnmower 100", and operation data is transferred 420 from the original robotic lawnmower 100 to the replacement robotic lawnmower 100", whereby the replacement robotic lawnmower 100" is enabled 430 to operate as a replacement for the original robotic lawnmower 100.

By enabling the robotic lawnmowers to copy each other, any user must have access to the original robotic lawnmower to enable a replacement robotic lawnmower to operate in a specific work environment. The integrity of the system is thus protected as a stolen robotic lawnmower may not be enabled to operate in any robotic lawnmower system.

This process of copying the operation data thus solves many problems in one single action and enables the replacement robotic lawnmower to assume the duties of the original robotic lawnmower without the user having to perform any mundane tasks.

The invention claimed is:

1. A robotic working tool comprising a controller and a memory arranged to store operation data, the robotic working tool being configured to:
   receive original operation data of a second robotic working tool, wherein the original operation data relates to features of a work area associated with the second robotic working tool,
   store said original operation data in said memory, and
   operate according to said original operation data, thereby enabling the robotic working tool to act as a replacement working tool for the second robotic working tool in a robotic working tool system of the second robotic working tool,
   wherein the original operation data further comprises authorization data to permit the robotic work tool to operate within the work area.

2. The robotic working tool according to claim 1, wherein the robotic working tool further comprises a communication interface configured to enable a connection to the second robotic working tool.

3. The robotic working tool according to claim 1, wherein the robotic working tool is further configured to enable a replacement mode when executed, and the original operation data is received.

4. The robotic working tool according to claim 1, wherein the robotic working tool is further configured to operate as a replacement robotic working tool for a time period.

5. The robotic working tool according to claim 1, wherein the original operation data relates to an identifier of the robotic working tool.

6. The robotic working tool according to claim 1, wherein the original operation data relates to a controlling application of the robotic working tool.

7. The robotic working tool according to claim 1, wherein the original operation data relates to control signal characteristics.

8. The robotic working tool according to claim 1, wherein the robotic working tool is a robotic lawnmower.

9. A method for use in a robotic working tool comprising a memory arranged to store operation data, the method comprising:
   the robotic working tool receiving original operation data of a second robotic working tool, wherein the original operation data relates to features of a work area associated with the second robotic working tool,
   storing said original operation data in said memory, and
   operating according to said original operation data, thereby enabling the robotic working tool to act as a replacement working tool for the second robotic working tool in a robotic working tool system of the second robotic working tool,
   wherein the features of the work area define outdoor terrain classification information.

* * * * *